United States Patent [19]

Porter et al.

[11] 4,006,553
[45] Feb. 8, 1977

[54] FISHING LURE TRAY WITH HINGED COVER

[76] Inventors: Stephen G. Porter, 1020 NW. 49th St., Fort Lauderdale, Fla. 33313; Theodore J. Adams, 4280 NW. 10th Terrace, Fort Lauderdale, Fla. 33315

[22] Filed: Apr. 22, 1976

[21] Appl. No.: 679,313

[52] U.S. Cl. .......................... 43/54.5 R; 206/315 R; 220/21
[51] Int. Cl.² .......................................... A01K 97/06
[58] Field of Search .......... 220/20, 21, 339; 217/7; 206/315, 223; 43/54.5 R, 57.5 R

[56] References Cited

UNITED STATES PATENTS

| | | | |
|---|---|---|---|
| 2,220,817 | 11/1940 | Holmes | 43/57.5 R |
| 2,573,431 | 10/1951 | Gibson | 43/54.5 R |
| 2,629,964 | 3/1953 | Thunell | 43/57.5 A |
| 3,182,872 | 5/1965 | Brosseau | 43/57.5 R |
| 3,336,693 | 8/1967 | Lussier | 43/545 R |
| 3,490,169 | 1/1970 | Tweed | 43/57.5 R |
| 3,651,983 | 3/1972 | Havoen | 220/339 |
| 3,739,518 | 6/1973 | Ziegler | 220/20 |
| 3,780,468 | 12/1973 | Maffett | 43/54.5 R |

FOREIGN PATENTS OR APPLICATIONS

| | | | |
|---|---|---|---|
| 912,073 | 1946 | France | 43/57.5 R |

*Primary Examiner*—George E. Lowrance
*Assistant Examiner*—Bruce H. Bernstein
*Attorney, Agent, or Firm*—Clarence A. O'Brien; Harvey B. Jacobson

[57] ABSTRACT

An upwardly opening rectangular tray including front, rear and opposite side walls is provided and includes a bottom wall extending between and interconnecting the lower marginal portions of the upstanding walls. The front wall terminates upwardly in a generally horizontally forwardly projecting flange extending therealong and the forward extremity of the flange terminates in an upwardly projecting flange whose upper marginal portion is provided with upwardly opening notches spaced therealong. The front wall of the tray includes forwardly projecting upstanding ribs projecting outwardly therefrom and spaced along the front wall. The ribs project forwardly outwardly beyond the forwardly projecting and upstanding flange and the tray includes a cover movable into position overlying the upper marginal edges of the front, rear and opposite side walls. The cover includes an upwardly projecting flange extending along a forward marginal edge thereof and terminating upwardly in a horizontal forwardly projecting lip overlying the notched upper marginal portion of the upstanding flange. The notches are spaced centrally intermediate pairs of adjacent ribs and the spaces between adjacent ribs are adapted to receive the body portions of plug-type lures with the curved portions of the barbed hooks of the lures seated in the aforementioned notches and the barbed terminal ends of the hooks received between the upwardly projecting flange of the cover and the upstanding flange of the tray within the vertical spacing between the upper forwardly projecting lip of the cover and the horizontally forwardly projecting flange of the tray.

7 Claims, 3 Drawing Figures

FISHING LURE TRAY WITH HINGED COVER

BACKGROUND OF THE INVENTION

Various forms of tackle boxes specifically designed to house various fishing equipment such as artificial lures, sinkers, hooks, leaders and live bait have been heretofore provided. Some of these previous trays have been constructed of plastic and are compartmented to receive various types of fishing accessories in an orderly fashion. However, a serious fisherman will sometimes frequently change the artificial lure he is using and does not wish to lose valuable time in effecting a change of lures.

When the conventional type of tackle box including compartments therein for receiving artificial lures is opened the artificial lures are sometimes difficult to extract from individual compartments provided therefor or become tangled with adjacent lures if more than one lure is received in a single compartment. Accordingly, a need exists for a tackle box or similar construction which will enable a fisherman to frequently change artificial lures and with very little time required to effect each change of lures.

Examples of various forms of tackle boxes and other fishing accessory containers including some of the general structural and operational features of the instant invention are disclosed in U.S. Pat. Nos. 1,501,448, 2,208,649, 2,711,050, 3,024,563 and 3,490,169.

BRIEF DESCRIPTION OF THE INVENTION

The tray of the instant invention is compartmented to receive various different forms of fishing accessories therein including a plurality of lures. Further, the tray is provided with a cover which may be closed in order that all of the fishing accessories received within the tray may be retained therein. However, the front of the tray includes forwardly and outwardly projecting longitudinally spaced upstanding ribs defining lure body receiving zones between adjacent ribs and the upper forward marginal portion of the tray includes an upstanding flange provided with longitudinally spaced upwardly opening notches generally centered relative to the aforementioned recesses and in which the curved portions of the hooks of artificial lures may be received, the cover for the tray including a forwardly projecting and elevated horizontal flange portion which overlies the upper notched marginal edge of the flange in order to retain the curved hook portions of the lures positioned in the aforementioned recesses against accidental disengagement with the notched flange when the cover is in the closed position.

The main object of this invention is to provide a fishing lure tray and other fishing accessory container of the type provided with a top and including structural features whereby a reasonable number of preselected lures from within the tray or container may be supported in predetermined position on the exterior of the tray in a manner enabling a selected lure supported on the exterior of the tray to be readily removed from the tray and substituted on a fishing line as a replacement for a lure being removed from the fishing line.

Another object of this invention, in accordance with the immediately preceding object, is to provide a device which will provide such easy access to preselected lures as to enable rapid changing of lures to be effected with little effort.

Another very important object of this invention is to provide a container for housing artificial lures, sinkers, hooks, leaders and live bait as well as other fishing accessories.

A final object of this invention to be specifically enumerated herein is to provide an improved container for fishing lures which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
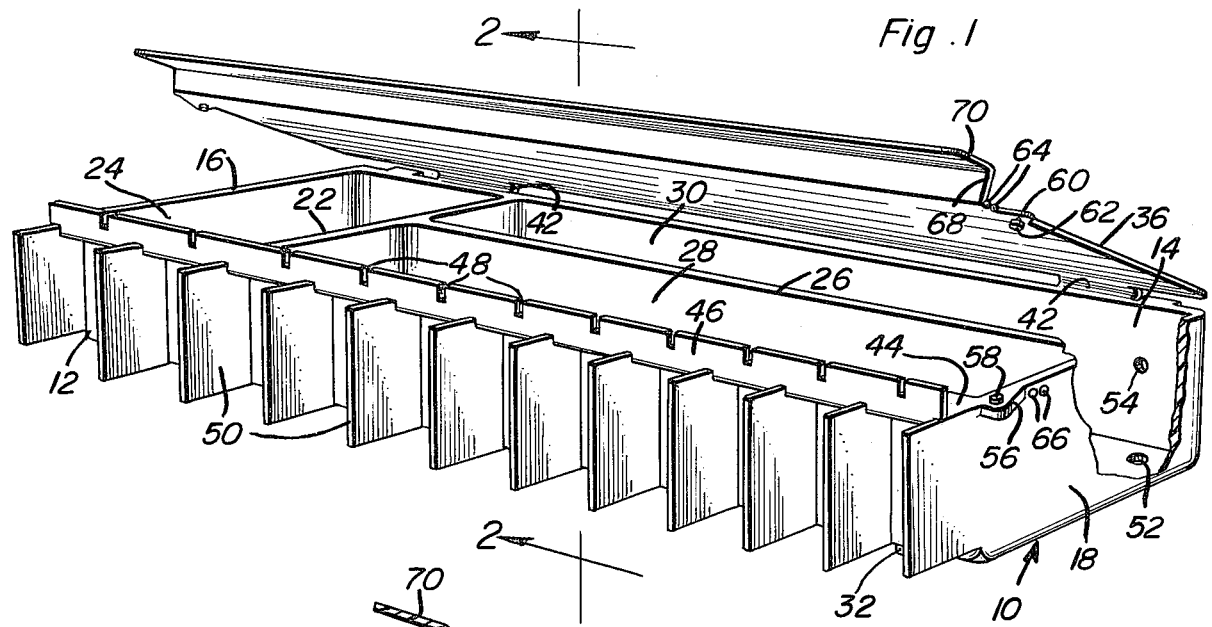
FIG. 1 is a perspective view of the tray of the instant invention with the cover portion thereof in a partially open position and the portions of one wall thereof being broken away and illustrated in vertical section.

Referring now more specifically to the drawings the numeral 10 generally designates the tray of the instant invention. The tray 10 includes upstanding front and rear walls 12 and 14 as well as opposite side or end walls 16 and 18 and a bottom wall 20 which extends between and interconnects the lower marginal portions of the walls 12, 14, 16 and 18. Still further, the tray 10 includes a transverse partition 22 at one end portion defining an end compartment 24 between the partition 22 and the end wall 16 and a longitudinal central partition 26 extending between the partition 22 and the end wall 18 dividing the remainder of the interior of the tray 10 into front and rear compartments 28 and 30.

Opposite end portions of the bottom wall 20 and the rear wall 14 include corresponding coextensive thickened reinforcing portions 32 and 34 extending across the underside of the bottom wall 20 and upwardly along the outer side of the rear wall 14. In addition, the tray 10 includes a cover 36 including front and rear marginal portions 38 and 40 and longitudinally spaced portions of the rear marginal portion 40 are joined to corresponding longitudinally spaced portions of the upper marginal edge of the rear wall 14 by means of integral hinge structures 42, the tray 10 including the cover 36 being constructed of plastic material.

The upper marginal edge portion of the front wall 12 terminates upwardly in a generally horizontal forwardly projecting flange 44 which terminates forwardly in an upstanding flange 46 provided with upwardly opening notches 48 spaced along its upper marginal edge portion.

The front wall 12 includes a plurality of longitudinally spaced upstanding and forwardly projecting ribs 50 and the ribs 50 project forwardly of the forwardly projecting flange 44 as well as the upstanding flange 46. Also, it will be noted from FIGS. 1 and 3 of the drawings that the notches 48 are generally centered intermediate pairs of adjacent ribs 50. The four corner portions of the bottom wall 20 are provided with drain openings 52 and the generally vertical midportions of the opposite ends of the rear wall 30 are provided with mounting bores 54 which extend through the reinforced portions 34 and may be utilized to attach the tray to any suitable support structure by means of conventional fasteners such as screws or the like.

Figure 2:
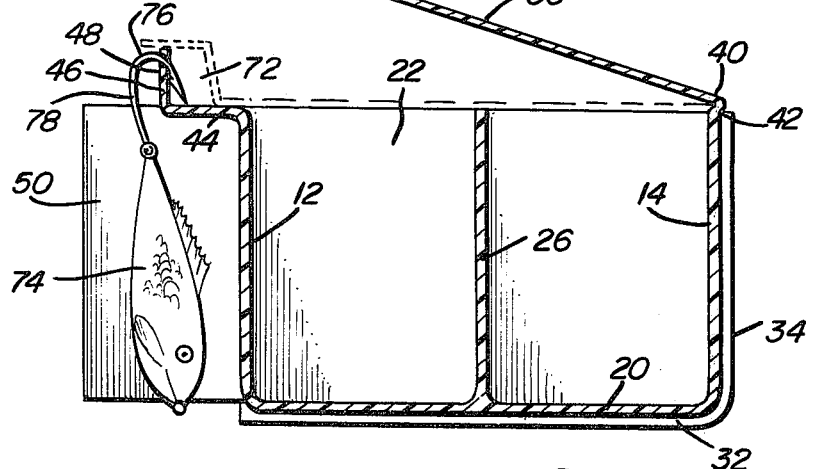
FIG. 2 is a transverse vertical sectional view taken substantially upon a plane indicated by the section line 2—2 of FIG. 1 and on somewhat of an enlarged scale illustrating the manner in which an artificial lure may be supported between adjacent forwardly projecting ribs carried by the front wall of the container or tray.
Figure 3:
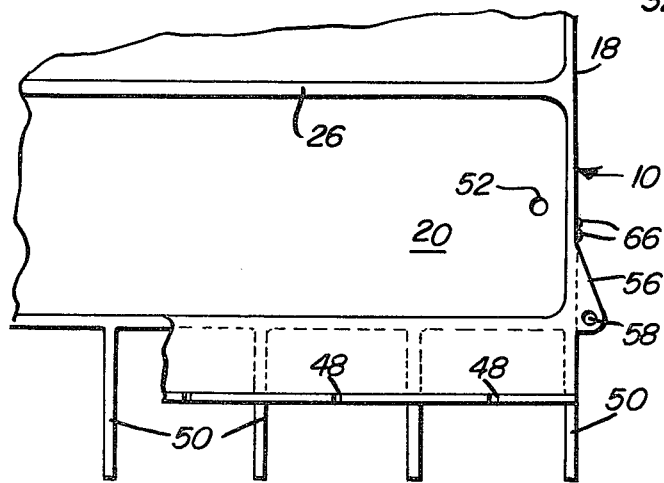
FIG. 3 is a fragmentary top plan view of the forward right-hand corner portion of the tray illustrated in FIG. 1.

It may be seen from FIGS. 1 and 3 of the drawings that the upper forward portions of the end walls 16 and 18 include outwardly projecting flanges 56 including upwardly projecting lugs 58, that forward portions of the opposite side marginal edge portions of the cover 36 include outwardly projecting flanges 60 including depending lugs 62 and that the forward extremities of the opposite end marginal portions of the cover 36 include spaced projections 64 while the forward portions of the opposite end walls include corresponding spaced projections 66. When the cover 36 is swung to a closed position such as that illustrated in phantom lines in FIG. 2 of the drawings the lugs 58 engage the projections 64 and the lugs 62 engage the projections 66 in order to frictionally retain the cover 36 in a closed position.

It may also be seen from FIGS. 1 and 2 of the drawings that the forward marginal edge portion of the cover 36 which overlies the upper marginal edge portion of the front wall 12 and at least the innermost portion of the flange 44 terminates forwardly in a forwardly and upwardly inclined flange 68 which in turn terminates upwardly in a horizontally forwardly projecting lip. From the phantom line representation of the cover 36 illustrated in FIG. 2 it may be seen that the flange 68 extends upwardly from the inner end of the flange 44 and that the lip 70 overlies the notched upper marginal edge portion of the flange 46 defining a chamber 72 between the flanges 46 and 48 and the flange 44 and the lip 70.

In operation, a plurality of artificial lures such as the plug 74 initially may be selected from within the tray 10 while the cover 36 is in the open position. Then, the curved portions 76 of the barbed hooks 78 of the lures 74 may be engaged in the notches 48 formed in the flange 46 in order to support the lures 74 between adjacent ribs 50. Thereafter, the cover 36 may be swung to the closed position in order that the portions of the hooks 78 within the chamber 72 will be retained therein against accidental dislodgement therefrom. Then, when it is desired to quickly change a lure it is merely necessary to snap the cover 36 to at least a partially open position and to remove the selected lure 74 from between the corresponding pair of adjacent flanges 50 after which the cover 36 may again be closed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A tray for fishing lures, said tray including upstanding front, rear and opposite side walls and a bottom wall extending between and interconnecting the lower marginal edge portions of said front, rear and opposite side walls, the upper marginal edge portion of said front wall including a generally horizontal forwardly projecting flange extending therealong, a plurality of upstanding ribs carried by said front wall, spaced longitudinally therealong and projecting forwardly thereof as well as said flange, the forwardly projecting flange terminating forwardly in an upstanding flange whose upper marginal portion is provided with upwardly opening notches each spaced therealong centrally intermediate adjacent ribs, said tray including a cover removably positionable in position closing the upper portion of said tray and including a forward marginal edge overlying the upper marginal edge of said front wall and including an upwardly projecting flange terminating upwardly in a horizontal forwardly projecting lip overlying said upper marginal portion of said upstanding flange closing the upper portions of said notches from above, said ribs being spaced apart sufficiently to receive the bodies of plug type lures therebetween and said notches being of dimensions to receive the curved portions of the barbed hooks of said lures therein with the barbed portions of said hooks received above said horizontally forwardly projecting flange and between said upstanding flange and said upwardly projecting flange below said lip.

2. The combination of claim 1 wherein said ribs are substantially parallel.

3. The combination of claim 1 wherein said cover comprises a panel member overlying the upper marginal portions of said front, rear and opposite side walls.

4. The combination of claim 3 wherein the rear marginal edge portion of said cover and the upper marginal edge portion of said rear wall include coacting means hingedly supporting said cover from said rear wall for angular displacement relative to said tray about an axis extending along the upper marginal edge portion of said rear wall.

5. The combination of claim 1 wherein said tray and cover are of one piece construction and constructed of plastic material.

6. The combination of claim 5 wherein said cover comprises a panel member overlying the upper marginal portions of said front, rear and opposite side walls.

7. The combination of claim 1 wherein said tray includes upstanding longitudinal and transverse partitions projecting upwardly from said bottom wall and dividing the interior of said tray into a plurality of upwardly opening compartments.

* * * * *